US006768903B2

(12) United States Patent
Fauconnier et al.

(10) Patent No.: US 6,768,903 B2
(45) Date of Patent: Jul. 27, 2004

(54) METHOD OF CONTROLLING A CHANNEL BETWEEN A RADIO TERMINAL AND A CELLULAR RADIOCOMMUNICATION INFRASTRUCTURE, AND ACCESS NETWORK IMPLEMENTING SUCH A METHOD

(75) Inventors: Denis Fauconnier, Saint-Remy-les-Chevreuses (FR); Claire Mousset, Maidehnead (FR)

(73) Assignee: Nortel Networks Limited (CA)

( * ) Notice: Subject to any disclaimer, the term of this patent is extended or adjusted under 35 U.S.C. 154(b) by 555 days.

(21) Appl. No.: 09/862,051

(22) Filed: May 21, 2001

(65) Prior Publication Data

US 2002/0013147 A1 Jan. 31, 2002

(30) Foreign Application Priority Data

May 23, 2000 (FR) .............................. 00 06562

(51) Int. Cl.$^7$ .............................. H04Q 7/20; H04Q 7/38
(52) U.S. Cl. ...................... 455/403; 455/410; 455/411; 455/422.1; 455/517; 380/247; 380/248; 380/249; 380/250; 380/33; 380/34
(58) Field of Search ................................ 455/403, 410, 455/411, 422.1, 432.1, 432.2, 432.3, 433, 435.1, 435.2, 445, 517, 550.1, 552.1, 404.1, 404.2, 423, 424, 425; 380/247, 248, 249, 250, 258, 33, 34, 42, 43

(56) References Cited

U.S. PATENT DOCUMENTS 5,204,902 A * 4/1993 Reeds et al. ............... 380/248
5,377,267 A * 12/1994 Suzuki et al. .............. 380/248
5,537,474 A * 7/1996 Brown et al. .............. 380/248

FOREIGN PATENT DOCUMENTS

GB 2 236 458 4/1991
WO WO 92/02088 2/1992
WO WO 93 25021 12/1993
WO WO 98 09458 3/1998

OTHER PUBLICATIONS

Technical Specification 3G TS 25.301, "Radio Interface Protocol", version 3.4.0, Publication of the 3$^{rd}$ Generation Partnership Project, Mar. 2000.
Technical Specification 3G TS 25.321, "MAC Protocol Specification", version 3.3.0, Publication of the 3$^{rd}$ Generation Partnership Project, Mar. 2000.
Technical Specification 3G TS 25.331, "RRC Protocol Specification", version 3.2.0, Publication of the 3$^{rd}$ Generation Partnership Project, Mar. 2000.
Technical Specification 3G TS 25.401, "UTRAN Overall Description", version 3.1.0, Publication of the 3$^{rd}$ Generation Partnership Project, Jan. 2000.
Technical Specification 3G TR 25.832, "Manifestations of Handover and SRNS Relocations", version 3.0.0, Publication of the 3$^{rd}$ Generation Partnership Project, Oct. 1999.

* cited by examiner

Primary Examiner—William Trost
Assistant Examiner—Keith Ferguson
(74) Attorney, Agent, or Firm—Piper Rudnick LLP (57) ABSTRACT

Ciphered information is transmitted over a first communication path in circuit mode between a core network and a terminal, passing through a first master controller, then over a second path between the core network and the terminal, passing through a second master controller. The second path is established in a procedure comprising the transmission of data from the first to the second master controller, a phase of simultaneous transmission of radio signals by the infrastructure on the first and second paths, then the suppression of the first path. The radio signals transmitted on the two paths during the phase of simultaneous transmission transport the same information, ciphered with offset sequence numbers, and the radio terminal switches over from the first to the second path while advancing the ciphering sequence number in such a way as to align it with the offset number used by the second controller.

31 Claims, 4 Drawing Sheets

METHOD OF CONTROLLING A CHANNEL BETWEEN A RADIO TERMINAL AND A CELLULAR RADIOCOMMUNICATION INFRASTRUCTURE, AND ACCESS NETWORK IMPLEMENTING SUCH A METHOD

BACKGROUND OF THE INVENTION

The present invention relates to the field of radiocommunications, and in particular to the ciphering techniques used in cellular networks.

The invention finds application in particular in third-generation cellular networks of the UMTS type ("Universal Mobile Telecommunication System") using code division multiple access (CDMA) techniques.

Figure 1:
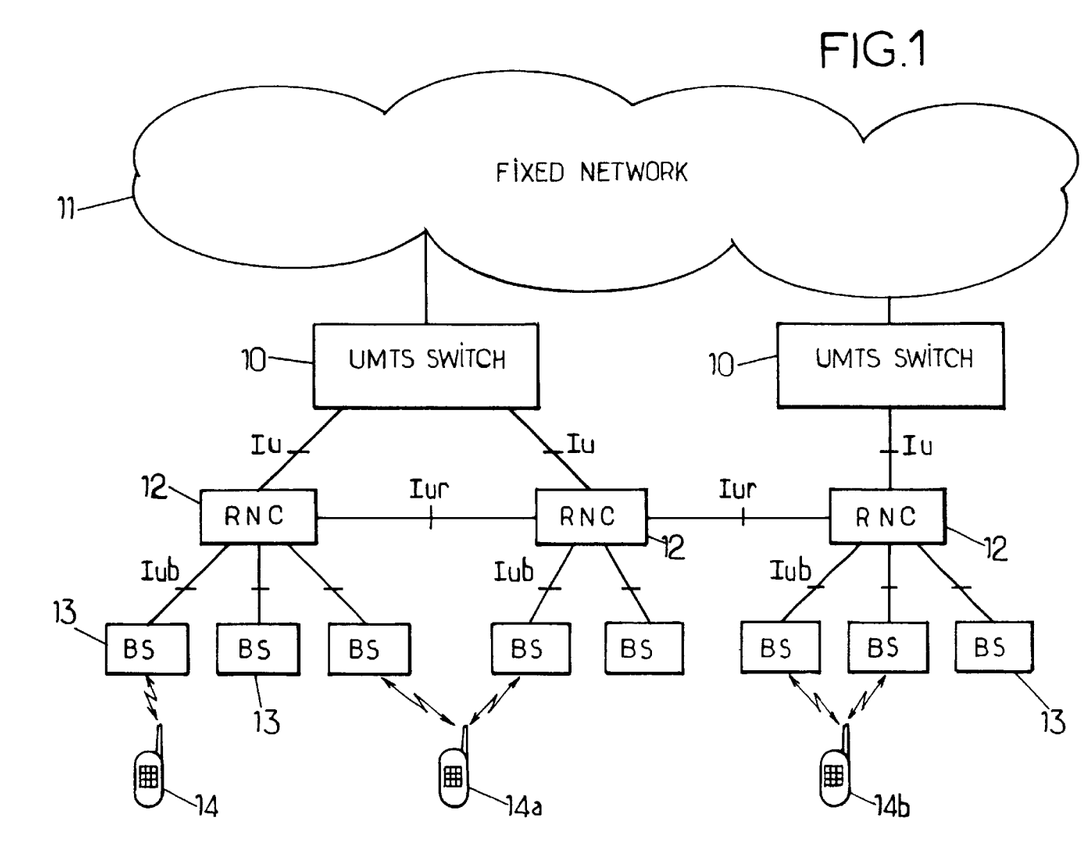
FIG. 1, previously commented on, is a diagram of a UMTS network.

The invention is described hereinbelow in its application to a UMTS network, of which FIG. 1 shows the architecture.

The switches of the mobile service 10, belonging to a core network (CN), are linked on the one hand to one or more fixed networks 11 and on the other hand, by means of a so-called Iu interface, to control equipment 12 or RNCs ("Radio Network Controllers") Each RNC 12 is linked to one or more base stations 13 by means of a so-called Iub interface. The base stations 13, distributed over the territory covered by the network, are capable of communicating by radio with the mobile terminals 14, 14a, 14b called UE ("User Equipment"). The base stations can be grouped together to form nodes called "node B". Certain RNCs 12 may furthermore communicate with one another by means of a so-called Iur interface. The RNCs and the base stations form an access network called UTRAN ("UMTS Terrestrial Radio Access Network").

The UTRAN comprises elements of layers 1 and 2 of the OSI model with a view to providing the links required on the radio interface (called Uu), and a stage 15A for controlling the radio resources (RRC, "Radio Resource Control") belonging to layer 3, as described in the technical specification 3G TS 25.301, "Radio Interface Protocol", version 3.4.0, published in March 2000 by the 3GPP ($3^{rd}$ Generation Partnership Project). Seen from the higher layers, the UTRAN acts simply as a relay between the UE and the CN.

Figure 2:
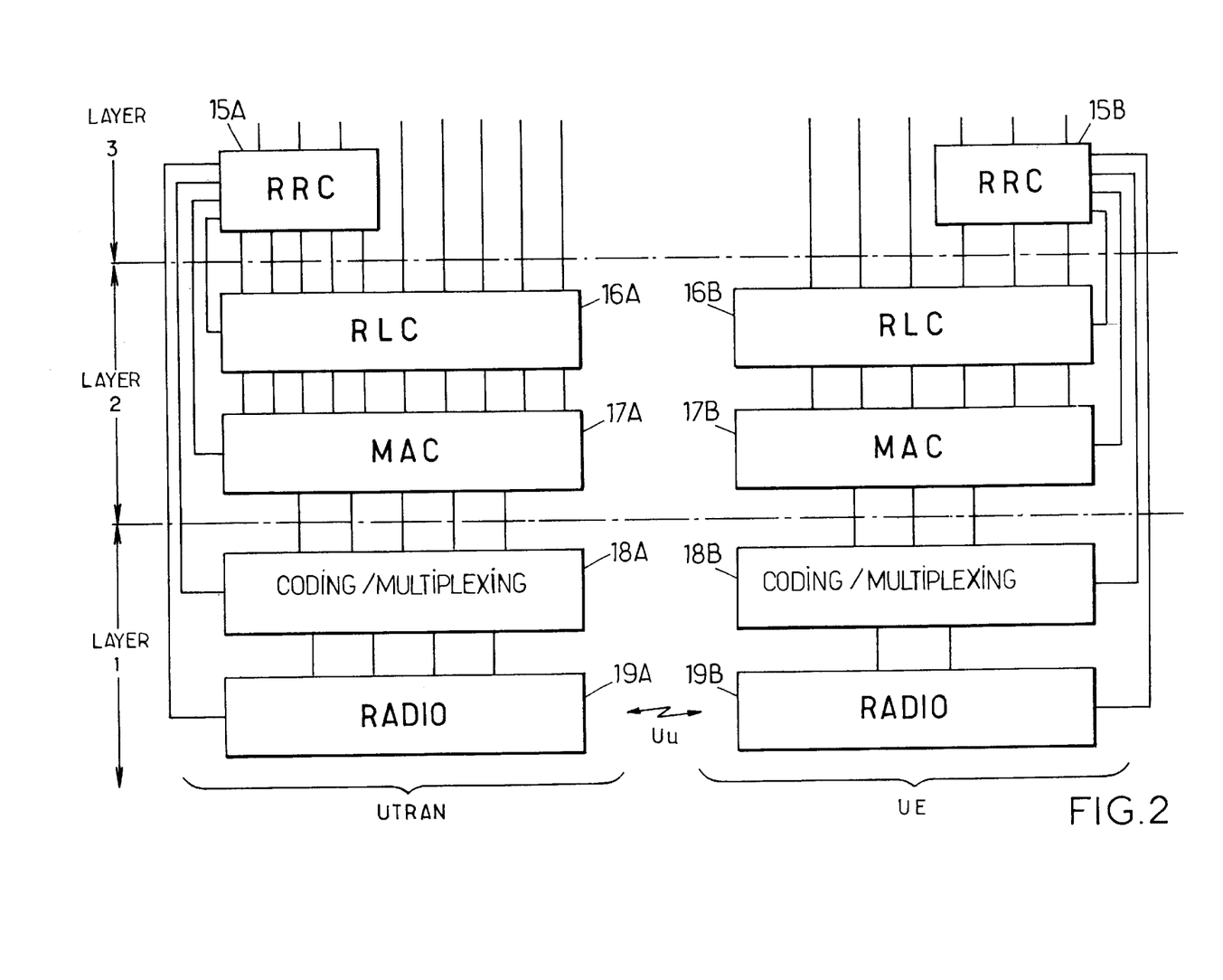
FIG. 2, previously commented on, is a chart showing the organization in layers of communication protocols employed over the radio interface of the UMTS network.

FIG. 2 shows the RRC stages 15A, 15B and the stages of the lower layers which belong to the UTRAN and to UE. On each side, layer 2 is subdivided into a radio link control (RLC) stage 16A, 16B and a medium access control (MAC) stage 17A, 17B. Layer 1 comprises a coding and multiplexing stage 18A, 18B. A radio stage 19A, 19B caters for the transmission of the radio signals from trains of symbols provided by the stage 18A, 18B, and the reception of the signals in the other direction.

There are various ways of adapting the architecture of protocols according to FIG. 2 to the hardware architecture of the UTRAN according to FIG. 1, and in general various organizations can be adopted depending on the types of channels (see section 11.2 of the technical specification 3G TS 25.401, "UTRAN Overall Description", version 3.1.0, published in January 2000 by the 3GPP). The RRC, RLC and MAC stages are located in the RNC 12. Layer 1 is located for example in node B. A part of this layer may however be located in the RNC 12.

When several RNCs are involved in a communication with UE, there is generally a so-called serving RNC called SRNC where the modules pertaining to layer 2 (RLC and MAC) are located, and at least one drift RNC called DRNC to which is linked a base station with which the UE is in a radio link. Appropriate protocols cater for the exchanges between these RNCs over the Iur interface, for example ATM ("Asynchronous Transfer Mode") and AAL2 ("ATM Adaptation Layer No. 2"). These same protocols can also be employed over the Iub interface for the exchanges between a node B and its RNC.

Layers 1 and 2 are each controlled by the RRC sublayer, whose characteristics are described in the technical specification 3G TS 25.331, "RRC Protocol Specification", version 3.1.0, published in October 1999 by the 3GPP. The RRC stage 15A, 15B supervises the radio interface. Moreover, it processes streams to be transmitted to the remote station according to a "control plan", as opposed to the "user plan" which corresponds to the processing of the user data arising from layer 3.

The RLC sublayer is described in the technical specification 3G TS 25.322, "RLC Protocol Specification", version 3.2.0, published in March 2000 by the 3GPP. In the transmit direction, the RLC stage 16A, 16B receives, according to the respective logical channels, data streams consisting of service data units (RLC-SDU) arising from layer 3. An RLC module of the stage 16A, 16B is associated with each logical channel so as in particular to perform a segmentation of the RLC-SDU units of the stream into protocol data units (RLC-PDU) addressed to the MAC sublayer and comprising an optional RLC header. In the receive direction, an RLC module conversely performs a reassembling of the RLC-SDU units of the logical channel from the data units received from the MAC sublayer.

The RLC stage 16A, 16B can have several modes of operation as a function in particular of the type of logical channel. Subsequently in the present description, consideration will be given to the transparent mode of the RLC sublayer, which is suitable for a logical channel relating to a communication in circuit mode. In this transparent mode, the RLC module performs the segmentation and reassembling operations when they are necessary, and it does not introduce any header into the RLC-PDU units.

The MAC sublayer is described in the technical specification 3G TS 25.321, "MAC Protocol Specification", version 3.3.0, published in March 2000 by the 3GPP. It transposes one or more logical channels onto one or more transport channels TrCH. In the transmit direction, the MAC stage 17A, 17B can multiplex one or more logical channels in one and the same transport channel. On such a transport channel, the MAC stage 17A, 17B delivers successive transport blocks TrBk each consisting of an optional MAC header and an RLC-PDU unit arising from an associated logical channel.

For each TrCH, the RRC sublayer provides the MAC sublayer with a set of transport formats (TFS, "Transport Format Set"). A transport format comprises a transmission time interval (TTI) equal to 10, 20, 40 or 80 ms, a transport block size, a transport block set size and parameters defining the protection scheme to be applied in the TrCH by layer 1 for detecting and correcting transmission errors. Depending on the current bit rate on the logical channel or channels associated with the TrCH, the MAC stage 17A, 17B selects a transport format from the TFS assigned by the RRC sublayer, and it delivers in each TTI a set of transport blocks complying with the selected format, whilst indicating this format to layer 1.

Layer 1 can multiplex several TrCHs on a given physical channel. In this case, the RRC sublayer assigns a set of combinations of transport formats (TFCS, "Transport Format Combination Set") to the physical channel, and the MAC sublayer dynamically selects a combination of transport formats from this TFCS set, thereby defining the transport formats to be used in the various multiplexed TrCHs.

UMTS uses the spread spectrum CDMA technique, that is to say the symbols transmitted are multiplied by spreading codes consisting of samples called "chips" whose rate (3.84 Mchip/s in the case of UMTS) is greater than that of the symbols transmitted. The spreading codes distinguish various physical channels (PhCH) which are superimposed on the same transmission resource consisting of a carrier frequency. The auto- and cross-correlation properties of the spreading codes enable the receiver to separate the PhCHs and to extract the symbols intended therefor. For UMTS in FDD mode ("Frequency Division Duplex") on the downlink, a scrambling code is allocated to each base station, and various physical channels used by this base station are distinguished by mutually orthogonal channel codes (channelization codes). The base station can also use several mutually orthogonal scrambling codes. On the uplink, the base station uses the scrambling code to separate the transmitting UEs, and possibly the channel code to separate the physical channels arising from one and the same UE. For each PhCH, the overall spreading code is the product of the channel code and the scrambling code. The spreading factor (equal to the ratio of the chip rate to the symbol rate) is a power of 2 lying between 4 and 512. This factor is chosen as a function of the bit rate of symbols to be transmitted on the PhCH.

The various physical channels are organized in 10 ms frames which follow one another on the carrier frequency used by the base station. Each frame is subdivided into 15 time slots of 666 $\mu$s. Each slot can carry the superimposed contributions of one or more physical channels, comprising common channels and DPCH ("Dedicated Physical CHannel") dedicated channels. Each DPCH conveys with the data a transport format combination indicator TFCI arising from the MAC sublayer, enabling the destination MAC module to retrieve the structure of the TrBks.

For one and the same communication, it is possible to establish several DPCHs corresponding to different channel codes, whose spreading factors may be equal or different. This situation is encountered in particular when a DPCH is not sufficient to provide the transmission bit rate required by the application. Furthermore, this same communication can use one or more transport channels. The coding and the multiplexing of the information symbol streams arising from the TrCHs on the PhCHs are described in detail in the technical specification 3G TS 25.212, "Multiplexing and channel coding (FDD)", version 3.0.0, published in October 1999 by the 3GPP.

As regards each logical channel for which the processing module of the RLC sublayer operates in transparent mode, the MAC stage 17A, 17B caters moreover for ciphering of the information transmitted and deciphering of the information received. On the corresponding transport channel, the TrBks relating to this logical channel each consist of an RLC-PDU unit ciphered according to a mechanism described in chapter 8 of the aforesaid 3G TS 25.301 specification.

Figure 3:
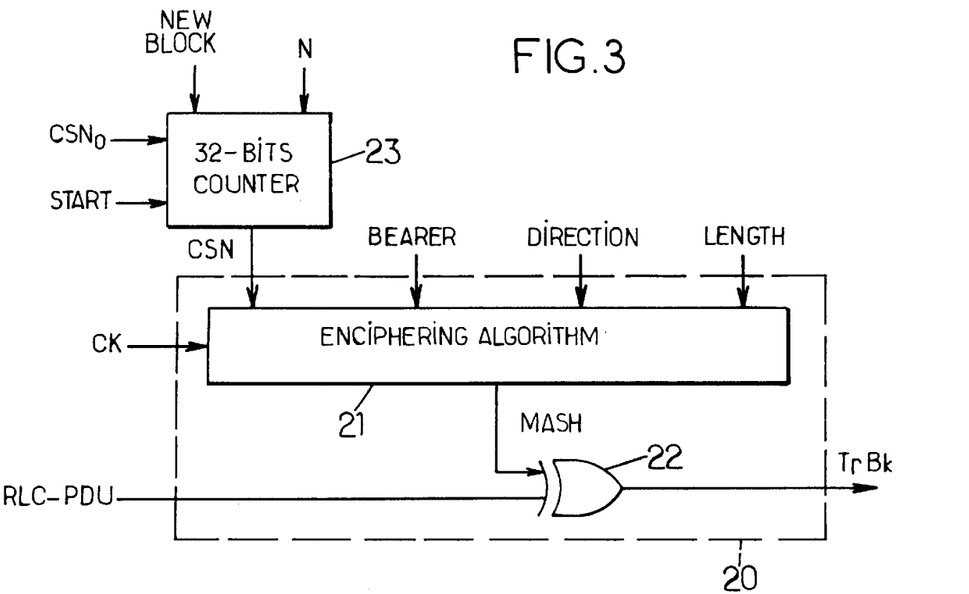
FIG. 3, previously commented on, is a schematic diagram of a ciphering module used in the MAC layer of a UMTS network.

FIG. 3 illustrates the ciphering module 20 of the MAC stage 17A, 17B of the RNC or of the UE, used for a logical channel. An ciphering algorithm 21 is executed so as to generate a binary mask which is combined with the information bits of the RLC-PDU unit received in transparent mode from the RLC, by an exclusive OU operation (gate 22). An identical module is useable for deciphering. The algorithm 21 calculates the mask on the basis of the following parameters:

CK: secret ciphering key of M=32 bits, defined in a prior phase of authentication between the core network and the UE;

CSN: ciphering sequence number composed of M=32 bits;

BEARER: logical channel identifier, serving to generate different masks for the various logical channels;

DIRECTION: bit indicating the direction of transmission (uplink or downlink), serving to generate different masks in both directions;

LENGTH: length of the mask in number of bits, given by the RRC stage as a function of the transport format.

The algorithm 21 combines the M-bit number CSN with the key CK with the aim of precluding the same mask from being used to encipher different blocks. This number CSN is incremented at the rate of the 10 ms radio frames. FIG. 3 thus shows the 32-bit counter 23 which delivers the parameter CSN. This counter increments the number CSN by a quantity N with each new block of the logical channel, N being the number of frames per TTI on the transport channel bearing this logical channel (N=1, 2, 4 or 8). The counter is therefore incremented by 1 every 10 ms, by 2 every 20 ms, by 4 every 40 ms or by 8 every 80 ms. On initializing the ciphered communication, the RRC stage provides an initial value $CSN_0$ of the number CSN and a start command for the counter 23 (START). These operations are performed both in the RNC where the MAC task is executed and in the UE.

A problem considered in the present invention is that of the transferring of the CSN counters upon a shift of the MAC module catering for the ciphering function in the network infrastructure. Such a movement takes place in the context of a transfer procedure involving a change of radio access resource (handover). The transfer procedure can thus give rise to a change of SRNC, thereby requiring the CSN counter of the new SRNC to be synchronized with that of the previous SRNC (and of the UE), whereas the Iu and/or Iur interfaces available to the RNCs for communicating with one another are asynchronous. It is also possible to envisage cases where the movement of the MAC module would take place inside one and the same RNC, if the latter uses different circuits to manage the access resources employed before and after the transfer.

Various possible scenarios for the transfer procedure are described in the technical specification 3G TR 25.832, "Manifestations of Handover and SRNS Relocation", version 3.0.0, published in October 1999 by the 3GPP. One distinguishes between on the one hand soft handover (SHO) which uses a macrodiversity mode and which may possibly be followed by a change of SRNC called "relocation" and on the other hand hard handover (HHO) which corresponds for example to a change of carrier frequency (with or without change of RNC) and/or to a handoff between two RNCs (of one and the same access network or of different access networks) which cannot communicate with one another via an Iur interface. An HHO can take place inside a UTRAN if several carrier frequencies are allotted to its operator or if Iur interfaces are not provided between all the RNCs of this UTRAN. An HHO can also take place between two separate access networks, for example between two UTRANs or between a UTRAN and a system of a different kind based on a similar functional architecture making it possible in particular to use the same ciphering procedures, such as a system of the GERAN type ("GSM/EDGE Radio Access Network").

In FDD mode, the UMTS supports a macrodiversity technique, which consists in making provision for UE to be able to communicate simultaneously with separate base stations in such a way that, in the downlink, the UE receives the same information several times and, in the uplink, the radio signal transmitted by the UE is picked up by the base stations so as to form different estimates which are subsequently combined in the UTRAN.

The macrodiversity affords a gain in reception which improves the performance of the system by virtue of the combining of different observations of one and the same item of information. It also makes it possible to carry out soft intercell transfers (SHO), when the UE moves.

In macrodiversity mode, the routing of the transport channels for multiple transmission from the UTRAN or UE and the combining of these transport channels in reception are operations which are incumbent on a selection and combining module belonging to layer 1. This module is at the interface with the MAC sublayer, and it is located in the RNC serving the UE. If the base stations involved depend on different RNCs communicating through the Iur interface, one of these RNCs plays the role of SRNC and the other that of DRNC.

When an SHO is completed, the radio link between the UE and the original base station is broken. It may then happen that no base station within whose range the UE is located is within the dependency of the SRNC.

The UTRAN may very well continue to support the communication in this way. However, this is not optimal since it is possible to dispense with the exchanges occurring on the Iur interface and to free the previous SRNC, by contriving matters so that the DRNC becomes the new SRNC for the communication in progress. This is the subject of the relocation procedure ("SRNS Relocation", see section 7.2.3.2 of the aforesaid 3G TS 25.401 specification), triggered on the initiative of the previous SRNC.

This relocation procedure comprises the transferring of the RLC and MAC instances (as well as of the selection and recombination module of layer 1 if the macrodiversity is maintained) from the previous SRNC to the previous DRNC.

A problem posed by this is the transferring of the CSN counter employed by the ciphering algorithm in the transparent RLC mode. Specifically, this counter must remain synchronous with that situated in the MAC layer on the UE side, whereas the links between the RNCs (through the Iu interface and the core network or through the Iur interface) are in principle asynchronous.

The 32-bit number CSN can be broken down into a connection frame number CFN corresponding to the P least significant bits (LSB) of CSN and into a HyperFrame Number HFN corresponding to the 32-P most significant bits (MSB) (P=8 according to chapter 8 of the aforesaid 3G TS 25.301 specification).

The RNC supervising each cell served by a base station 13 updates for this cell a system frame number SFN, coded on Q=12 bits, which is incremented with each new 10 ms radio frame. This number SFN is broadcast by the base station over its common control channels.

An UE measures the time offset between the signals which it picks up from the cells neighboring its current cell and its own clock. Before the triggering of an SHO to a target cell, the UE provides its SRNC with the offset which it has measured in respect of this target cell, which corresponds to the offset, within a span of $2^P \times 10$ ms (i.e. 2.56 s), between the SFN counter of the target cell, obtained on the common channel, and its own CFN counter. This offset is determined, on the basis of detecting synchronization patterns, with a temporal precision substantially finer than 10 ms, for example of the order of the symbol time. It serves to temporally clamp the transmission of the new base station, to which it is addressed through the Iur interface, so that in macrodiversity mode, the information items received by the UE from the various stations are not too offset with respect to one another, which would require an excessive amount of memory to be able to combine the observations.

Owing to the provision of this offset, the DRNC knows a priori the P least significant bits of the CSN counter to be employed for ciphering and deciphering. However, this does not provide the most significant bits (HFN). The current 3GPP specifications provide for the relocation procedure to comprise the sending by the SRNC of a message "Relocation_Required" over the Iu interface, in which the HFN number is inserted so that the DRNC can synchronize its ciphering sequence counter. On receipt of this message, the core network instigates the task which will lead to the routing of the communication to the DRNC, and retransmits the HFN to the latter transparently.

These arrangements do not solve the aforesaid problem since between the moment at which the SRNC transmits the value of HFN and that at which the DRNC receives it, the HFN in force on the UE side has been able to be incremented. This occurs each time the HFN takes more than 2.56 s to be received by the DRNC, this being difficult to avoid with certainty given the queues which may be encountered by the messages in the asynchronous core network and the times for processing the "Relocation_Required" message by the switches 10. Errors may also arise if the HFN takes less time to arrive at the DRNC: if it is transmitted at a moment where CFN is equal to 255 for example, it is very likely to be received by the DRNC after incrementation of the HFN value at the UE.

The above problem is encountered, with even greater acuteness, in the HHOs which are executed without using the macrodiversity mode.

In an HHO, there is generally a double broadcasting phase during which the same item of downlink information is transmitted simultaneously on both access resources. This enables the UE to receive the information intended for it without interruption as soon as it switches to the second access resource. Hence, the RNC in charge of the target cell must rapidly become aware of the ciphering sequence counter CSN relating to the UE when an HHO is to be executed. Moreover, the RNC of the target cell, if it is different from the previous SRNC, generally has no prior awareness of the CFN counter since there is no macrodiversity. The value sent by the previous SRNC must therefore cover as far as the least significant bits of CSN so that it will very likely be obsolete when it is received by the RNC of the target cell, given the routing times through the asynchronous network. This drawback is difficult to eliminate in the absence of synchronization of the base stations, which synchronization is not necessary for the operation of a UMTS network and is not utilized by the standard.

It should be noted that in the non-transparent modes of the RLC sublayer, the problem considered above does not arise. These non-transparent modes are intended for packet transmissions, for which there is generally no harm in momentarily interrupting the transmission during a handover or during a relocation procedure so as to ensure, for example by an acknowledgement mechanism, that the correct counter value has been received. Moreover, it is the RLC sublayer which caters for the ciphering/deciphering function in the non-transparent mode, by using a sequence number of the header of each RLC-PDU unit to encipher the data contained in this RLC-PDU unit. This sequence number is transmitted unencrypted, so that the ciphering counters need not be synchronized at the two ends.

In the second-generation GSM systems ("Global System for Mobile communication") using Time Division Multiple Access (TDMA) techniques, the ciphering is effective only over the air interface. The incrementation of the ciphering key is based on the synchronization with respect to the TDMA hyperframes, which is achieved in an unambiguous manner on either side of the radio link in the framework of the time multiplexing scheme. Therefore, the above problem does not arise either.

WO98/09458 discloses a radio access system derived from GSM, in which the ciphering of the communications is carried out only over the air interface. A constraint of this system is that it requires synchronization of the base stations on the scale of the TDMA multiframes. Moreover, the synchronization of the ciphering counters is lost when the exchanges between the base stations take a time greater than the relatively short duration of a multiframe (120 ms).

An object of the present invention is to afford a solution to the problem of synchronizing ciphering counters in particular in the case of the HHO.

SUMMARY OF THE INVENTION

The invention thus proposes a method of controlling a circuit mode communication logical channel between a radio terminal and a cellular radiocommunication infrastructure. The infrastructure comprises at least one core network, radio network controllers linked to the core network and comprising first and second controllers, and base stations provided with radio interfaces and each linked to one of the radio network controllers. The method comprises the following steps:

- establishing at least one first communication path between the core network and the terminal, passing through one of the base stations using a first radio access resource and through the first controller constituting a master controller for said first path;
- transmitting information pertaining to the logical channel along the first communication path;
- establishing at least one second communication path between the core network and the terminal, passing through one of the base stations using a second radio access resource, different from the first resource, and through the second controller constituting a master controller for said second path; and
- transmitting information pertaining to the logical channel along the second communication path.

The information transmitted along each communication path is ciphered in a portion of said path going from the master controller to the radio terminal. The ciphering is performed as a function of parameters comprising a secret key and a ciphering sequence number combined with said key. The master controller and the terminal jointly increment the ciphering sequence number at the rate of frames of determined duration, so as to have the same ciphering parameters to allow deciphering of the information. The second path is established in a transfer procedure comprising transmitting adjustment data from the first controller to the second controller, a phase of simultaneous transmission of radio signals on the first and second access resources by the respective base stations of the first and second paths, then suppressing the first path. The radio signals transmitted on the first and second access resources in the phase of simultaneous transmission transport the same information, said information being ciphered by the second controller with a ciphering sequence number which is offset in advance with respect to that used by the first controller to encipher the information transmitted along the first path. The radio terminal switches over from the first access resource to the second access resource in the phase of simultaneous transmission, by advancing the ciphering sequence number so as to align it with the offset number used by the second controller.

The transfer procedure preferably comprises, after the reception of the adjustment data by the second controller, the transmission of a switchover control message from the second controller to the radio terminal through the first controller. This message may indicate, with respect to a time reference available to the radio terminal and to the second controller, an initialization frame to which an initialization value of the offset ciphering sequence number corresponds, said initialization value being determinable by the radio terminal and by the second controller.

In one embodiment of the method, the ciphering sequence numbers are represented on M bits, and the adjustment data comprise a quantity represented by the M-P most significant bits of a current value of the ciphering sequence number used by the first controller, M and P being integers such that $0 \leq P < M$. The switchover control message may then indicate the P least significant bits of an initialization value of the offset ciphering sequence number and/or its M-P most significant bits corresponding to the said quantity, increased so as to ensure the advance of the offset ciphering sequence number. This initialization value of the offset number corresponds to an initialization frame determinable by the terminal and by the second controller.

The adjustment data optionally comprise data representative of an offset between the ciphering sequence number used by the first controller and a time reference available to the second controller.

Another aspect of the present invention relates to an access network of a cellular radiocommunication system comprising at least one radio network controller arranged to implement a method as defined hereinabove.

DESCRIPTION OF PREFERRED EMBODIMENTS

Figure 4:
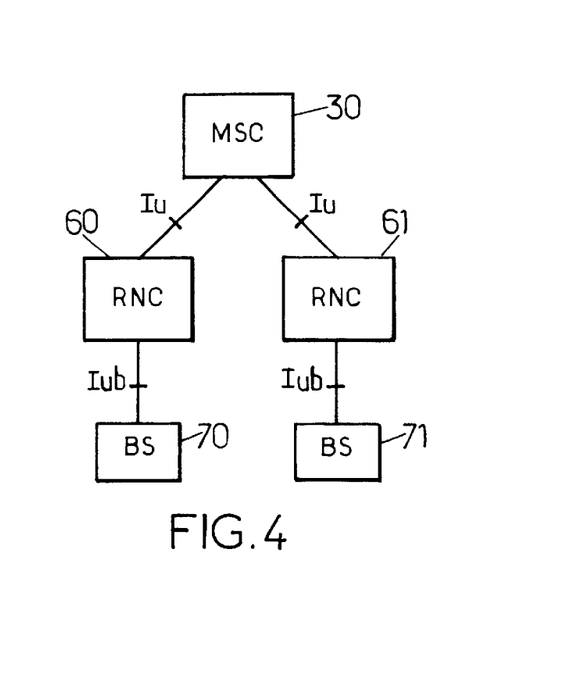
FIG. 4 is a simplified diagram of a UMTS network to which the invention may be applied.

The infrastructure sketched in FIG. 4 has a deliberately simplified configuration to clarify the explanation of the invention. The core network comprises a mobile service switch MSC, ("Mobile service Switching Center") 30 for the circuit mode, linked by Iu interfaces to two radio network subsystems (SRNS) each having an RNC 60, 61. The two RNCs 60, 61 respectively monitor base stations 70, 71 (node B) through the Iub interfaces. In the example represented, there is no Iur interface between the two RNCs involved 60, 61. It will be noted that there could be such an Iur interface, but not serving for handover, for example because the latter is between two different carrier frequencies. In another embodiment, the RNCs 60, 61 belong to different access networks (a UTRAN and a GERAN for example).

Figure 5:
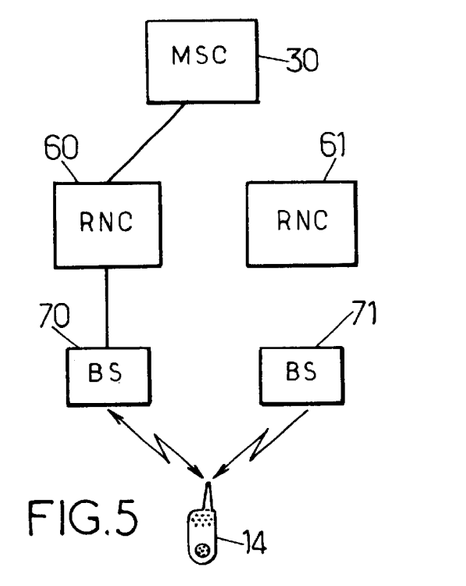
FIGS. 5 to 7 are diagrams of the network of FIG. 4 showing the links which are active at various instants of a communication.
Figure 6:
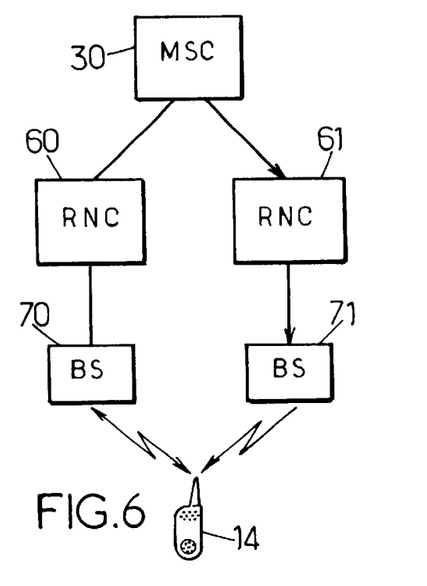
Figure 7:
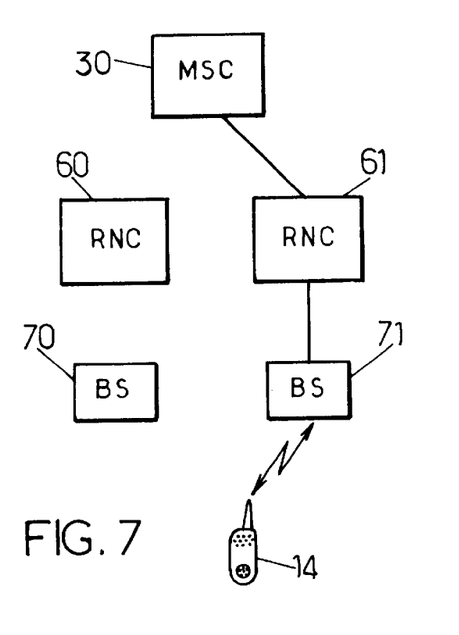

FIGS. 5 to 7 show active communication paths between the core network and UE 14 when the latter is moving, in a typical HHO scenario in the network configuration of FIG. 4. Initially (FIG. 5), a path is established in a conventional manner between the MSC 30 of the core network and the UE 14 through the source RNC 60 and the base station 70 which depends thereon. The SRNC 60 and the UE each have a MAC instance which, for each dedicated logical channel in circuit mode and each direction of communication, caters for the ciphering and deciphering functions in respect of the information transmitted over this first path, in the manner indicated with reference to FIG. 3. The static parameters (CK, BEARER, DIRECTION, LENGTH) of the module 20 and the initialization parameters of the counter 23 have been provided by the RRC stage.

The UE performs the prescribed measurements on the common channels of its neighboring cells in particular the channels of the base station 71 linked to the RNC 61 in the situation illustrated by FIG. 5. When the analysis of these measurements shows that an HHO to the base station 71 is desirable, the SRNC 60 sends its MSC 30 an HHO request message ("Handover_Prepare") designating the target RNC 61. In particular, for the implementation of the invention, it is advantageous for the UE 14 to measure the temporal offset $\Delta$ between its own ciphering sequence number CSN and the frame number SFN broadcast by the base station 71 over its common downlink channels. This offset $\Delta$ is measured with a finer resolution than that of the 10 ms frames. We denote by $\Delta_k$=(CSN−SFN) mod $2^k$ the number represented by the k least significant bits of the integer part of the offset $\Delta$ expressed in units of 10 ms ($1 \leq k \leq Q$). The CSN being on M=32 bits and the SFN on Q=12 bits, the UE measures $\Delta_Q = \Delta_{12}$. Within the context of the macrodiversity procedures, the UE reports $\Delta_P = \Delta_8$ to the UTRAN.

When handover is triggered, a second path is established, beginning with the downlink (FIG. 6). The same information pertaining to the logical channel is transmitted twice from the MSC 30 (or several MSCs), once by way of the RNC 60 and of the base station 70 and once by way of the RNC 61 and of the base station 71. In the uplink, the terminal 14 keeps the parameters of the physical channel of the first path until it receives a "Handover_Command" message asking it to switch over to the other base station 71. On receipt of this message, the UE 14 executes the command, doing so once the synchronized network completes the establishing of the second path. The first path is then suppressed (FIG. 7).

In the situation illustrated by FIG. 6, the downlink information is ciphered on the two paths between the RNC and UE. The RRC layer has for example applied the following process to start the counter 23 used to encipher and decipher in the MAC layer of the target RNC 61:

in the "Handover_Prepare" message, the source RNC 60 includes the current value HFNE of the hyperframe number HFN consisting of the M-P most significant bits of the CSN counter which it uses, this value HFNE being transmitted by the core network to the target RNC 61;

after having received this information, if it accepts handover, the target RNC 61 determines an initialization frame number SFNI for the counter 23, with respect to the SFN frame counter of the target base station 71, as well as a corresponding initialization value CSNI for the ciphering sequence number, in such a way that this sequence number is in advance with respect to that used on the first path between the RNC 60 and the UE;

when the MAC instance begins to encipher the information received from the MSC on the downlink, for a frame with number $SFN_0$ in the target cell, the RRC layer of the RNC 61 initializes the counter 23 of this MAC instance to the value $CSN_0$=(CSNI−SFNI+$SFN_0$) mod $2^M$, and it controls the base station 71 for transmission to the UE 14.

In parallel, in the switchover control message which it addresses to the UE through the core network and the source RNC 60 ("Handover_Command"), the target RNC 61 indicates the CSNI and SFNI parameters. Thus, at the moment at which the UE performs the switchover, it can reinitialize its counter 23 in such a way as to align it with that of the RNC 61, and this will allow ciphering and deciphering on the second path.

Specifically, the UE knows the $\Delta_Q$ and its CSN of the previous path at the moment of switchover, so that it can deduce therefrom the corresponding SFN in the target cell: SFN=(CSN−$\Delta_Q$) mod $2^Q$, and hence immediately reinitialize its counter 23 to the correct value for the second path:

$$CSN_0=(CSNI-SFNI+SFN) \bmod 2^M.$$

As soon as it switches over to the base station 71, the UE has its CSN number synchronized. It can therefore immediately receive the downlink information and transmit the uplink information with the correct ciphering. Once the base station 61 has acquired synchronization, the second path is completed.

This synchronization of the CSN counters is exact as soon as the HHO execution time, between the transmission by the source RNC of the "Handover_Prepare" message and the switchover of the UE, does not exceed $2^Q \times 10$ ms=40 s, which is in practice always the case.

The advance of the new CSN with respect to that used in the source cell serves to obtain the double transmission serving to minimize the interruption due to the HHO whilst preventing the same ciphering mask from being produced so as to encipher different blocks transmitted over the radio, this being required for security reasons.

It may be noted that the these results are obtained without requiring the target RNC to receive information about the origin CFN, this being problematic given the asynchronous transmission through the core network, nor even about the offset $\Delta$ observed by the UE.

To prevent the same ciphering mask from being produced to encipher different blocks, the initialization value CSNI should be determined as a function of an item of information provided from the source RNC, namely the parameter HFNE. The RNC 61 adds an offset $\theta > 0$ to this parameter so as to form the M-P most significant bits of the initialization value CSNI, and it assigns a predefined value CFNI to the P least significant bits, for example CFNI=0. It therefore takes CSNI=((HFNE+$\theta$)$\times 2^P$+CFNI) mod $2^M$.

The offset $\theta$ takes account of the probable execution times for the HHO. In the case where P=8, it is for example possible to take $\theta$=8, thereby providing an amply sufficient margin of the order of 20 s for the execution of the HHO. This offset $\theta$ can also be programmable.

It should be noted that the controllers 60 and 61 operating in the manner described hereinabove with reference to FIGS.

4 to 7 could, according to a variant of the invention, be two separate parts of an item of equipment situated at a given node of the network. This item of equipment may be of RNC type in the UMTS architecture, and the two separate parts may be circuits separately managing the two paths as regards at least the MAC layer, these circuits communicating with one another in an asynchronous manner. These circuits are for example carried by two different cards or contained in two different cabinets of the RNC.

It will also be noted that the above HHO procedure can take various equivalent forms. Thus, rather than containing CSNI and SFNI explicitly, the control message returned from the target RNC to the UE could contain only the difference (CSNI−SFNI) mod $2^M$ which is sufficient for synchronization, or any combination making it possible to retrieve this difference.

Furthermore, the data CSNI, SFNI indicated by the target RNC in the control message returned to the source RNC and to the UE can, in full or in part, be implicit:

if the offset θ is fixed or known to the source RNC, the latter can already be furnished with the M-P most significant bits (HFNE+θ) of the parameter CSNI, so that it is not essential for it to receive them again if it transmits them itself to the UE;

if the value CFNI is fixed (for example 0), it is not necessary to transmit it to the UE. The same holds if this value is defined with respect to the SFN of the target cell since the UE can determine this SFN with the aid of its CFN and of the offset $\Delta_Q$ which it has measured;

if the SFNI is a value which the UE can know, for example because it is fixed, it is not necessary to communicate it. This observation also holds in respect of only a low-order part of the SFNI.

In cases where the UE has forwarded to the source RNC 60 an offset value $\Delta_k$ between the CSN used jointly by the UE and the source RNC and the SFN of the target cell (for example k=P or k=Q), this RNC 60 can communicate it to the target RNC, in particular with the "Handover_Prepare" message. It may then be envisaged that the time reference available to the UE and with respect to which the initialization frame of the new CSN counter is defined should consist of the k least significant bits of the previous CSN. In particular, there may have been a macrodiversity phase between the source RNC and the target RNC on a first carrier frequency before performing an HHO with change of carrier to the target RNC. In such a case, the target RNC is already furnished with the offset $\Delta_Q$ or $\Delta_P$, so that it is not obligatory to repeat it at the moment of the HHO. It may also happen that another UE has had a macrodiversity phase between the source RNC (SRNC) and target RNC (DRNC). When the HHO procedure commences for the UE 14, the source RNC 60 can then determine the relevant value of the offset $\Delta_k$ without having necessarily received it from the UE 14: it deduces it from the CFN of the two UEs and from the offset measured and indicated by the other UE.

Other time references may also be used, if they are available both to the target RNC 61 and to the UE or to the source RNC, to express the initialization frame number SFNI or any quantity related to this number, for example:

the SFN of another base station linked to the target RNC, whose common control channel has been detected by the UE (or by another UE supervised by the source RNC);

the SFN of any base station, in particular that of the source cell, if the RNCs know the SFN offsets between the various cells, as is sometimes used for subscriber location services;

a time reference common to the RNCs, obtained for example by means of GPS type receivers or the like picking up synchronized signals transmitted by a constellation of satellites.

We claim:

1. Method of controlling a circuit mode communication logical channel between a radio terminal and a cellular radiocommunication infrastructure, the infrastructure comprising at least one core network, radio network controllers linked to the core network and comprising first and second controllers, and base stations provided with radio interfaces and each linked to one of the radio network controllers, the method comprising the steps of:

establishing at least one first communication path between the core network and the terminal, passing through one of the base stations using a first radio access resource and through the first controller constituting a master controller for said first path;

transmitting information pertaining to the logical channel along the first communication path;

establishing at least one second communication path between the core network and the terminal, passing through one of the base stations using a second radio access resource, different from the first resource, and through the second controller constituting a master controller for said second path; and transmitting information pertaining to the logical channel along the second communication path, wherein the information transmitted along each communication path is ciphered in a portion of said path going from the master controller to the radio terminal, the ciphering being performed as a function of parameters comprising a secret key and a ciphering sequence number combined with said key, whereby the master controller and the terminal jointly increment the ciphering sequence number at the rate of frames of determined duration, so as to have the same ciphering parameters to allow deciphering of the information, wherein the second path is established in a transfer procedure comprising transmitting adjustment data from the first controller to the second controller, a phase of simultaneous transmission of radio signals on the first and second access resources by the respective base stations of the first and second paths, then suppressing the first path, wherein the radio signals transmitted on the first and second access resources in the phase of simultaneous transmission transport the same information, said information being ciphered by the second controller with a ciphering sequence number which is offset in advance with respect to that used by the first controller to encipher the information transmitted along the first path, and wherein the radio terminal switches over from the first access resource to the second access resource in the phase of simultaneous transmission, by advancing the ciphering sequence number so as to align it with the offset number used by the second controller.

2. Method according to claim 1, wherein the transfer procedure comprises, after the reception of the adjustment data by the second controller, the transmission of a switchover control message from the second controller to the radio terminal through the first controller.

3. Method according to claim 2, wherein the switchover control message indicates, with respect to a time reference available to the radio terminal and to the second controller, an initialization frame to which an initialization value of the offset ciphering sequence number corresponds, said initialization value being determinable by the radio terminal and by the second controller.

4. Method according to claim 1, wherein the ciphering sequence numbers are represented on M bits, and the adjustment data comprise a quantity represented by the M-P most significant bits of a current value of the ciphering sequence number used by the first controller, M and P being integers such that $0 \leq P < M$.

5. Method according to claim 4, wherein the transfer procedure comprises, after the reception of the adjustment data by the second controller, the transmission of a switchover control message from the second controller to the radio terminal through the first controller, and wherein the P least significant bits of an initialization value of the offset ciphering sequence number are indicated in the switchover control message.

6. Method according to claim 5, wherein the initialization value of the offset number corresponds to at least one initialization frame determinable by the radio terminal and by the second controller.

7. Method according to claim 4, wherein the advance of the offset ciphering sequence number used by the second controller with respect to that used by the first controller is effected by increasing said quantity contained in the adjustment data received from the first controller, and by allocating the M-P bits of the quantity thus increased to the M-P most significant bits of an initialization value of the offset number.

8. Method according to claim 7, wherein the transfer procedure comprises, after the reception of the adjustment data by the second controller, the transmission of a switchover control message from the second controller to the radio terminal through the first controller, and wherein said increased quantity is indicated in the switchover control message.

9. Method according to claim 7, wherein the initialization value of the offset number corresponds to at least one initialization frame determinable by the radio terminal and by the second controller.

10. Method according to claim 4, wherein said offset is measured by the terminal on the basis of radio signals received from a base station linked to the second controller and carrying information relating to said time reference, and wherein the information relating to said time reference corresponds to a frame number represented on Q bits, Q being an integer such that $P < Q < M$.

11. Method according to claim 1, wherein the adjustment data comprise data representative of an offset between the ciphering sequence number used by the first controller and a time reference available to the second controller.

12. Method according to claim 11, wherein said offset is measured by the terminal on the basis of radio signals received from a base station linked to the second controller and carrying information relating to said time reference.

13. Method according to claim 12, wherein said time reference comprises a frame counter maintained for a base station linked to the second controller.

14. Method according to claim 1, wherein the adjustment data are transmitted from the first controller to the second controller through the core network.

15. Method according to claim 1, wherein the first and second radio access resources comprise different carrier frequencies.

16. Method according to claim 1, wherein the first and second controllers belong to different access networks.

17. Method according to claim 1, wherein the first and second controllers are situated at a common network node, and comprise separate circuits in relation to the first and second paths, for at least some of the communication protocols including the information ciphering and deciphering functions, whereby said circuits communicate with one another asynchronously.

18. Access network of a cellular radiocommunication infrastructure, comprising:
 radio network controllers linked to a core network of said infrastructure and including first and second radio network controllers;
 base stations provided with radio interfaces and each linked to one of the radio network controllers;
 means for establishing at least one first communication path between the core network and a radio the terminal, passing through one of the base stations using a first radio access resource and through the first controller constituting a master controller for said first path;
 means for transmitting information pertaining to a logical channel along the first communication path;
 means for establishing at least one second communication path between the core network and the terminal, passing through one of the base stations using a second radio access resource and through the second controller constituting a master controller for said second path; and
 means for transmitting information pertaining to the logical channel along the second communication path,
 wherein the information transmitted along each communication path is ciphered in a portion of said path going from the master controller to the radio terminal, the ciphering being performed as a function of parameters comprising a secret key and a ciphering sequence number combined with said key, whereby the master controller and the terminal jointly increment the ciphering sequence number at the rate of frames of determined duration, so as to have the same ciphering parameters to allow deciphering of the information,
 wherein the means for establishing the second path are responsive to a transfer procedure which comprises transmitting adjustment data from the first controller to the second controller, a phase of simultaneous transmission of radio signals on the first and second access resources by the respective base stations of the first and second paths, then suppressing the first path,
 wherein the first and second controllers are arranged to cause transmission of radio signals transporting the same information on the first and second access resources, respectively, in the phase of simultaneous transmission, said information being ciphered by the second controller with a ciphering sequence number which is offset in advance with respect to that used by the first controller to encipher the information transmitted along the first path.

19. Access network according to claim 18, wherein the second controller is arranged to transmit a switchover control message to the radio terminal through the first controller in the transfer procedure after the reception of the adjustment data.

20. Access network according to claim 19, wherein the switchover control message indicates, with respect to a time reference available to the radio terminal and to the second controller, an initialization frame to which an initialization value of the offset ciphering sequence number corresponds, said initialization value being determinable by the radio terminal and by the second controller.

21. Access network according to claim 18, wherein the ciphering sequence numbers are represented on M bits, and the adjustment data comprise a quantity represented by the M-P most significant bits of a current value of the ciphering sequence number used by the first controller, M and P being integers such that $0 \leq P < M$.

22. Access network according to claim 21, wherein the second controller is arranged to transmit a switchover control message to the radio terminal through the first controller in the transfer procedure after the reception of the adjustment data, and wherein the P least significant bits of an initialization value of the offset ciphering sequence number are indicated in the switchover control message.

23. Access network according to claim 22, wherein the initialization value of the offset number corresponds to at least one initialization frame determinable by the radio terminal and by the second controller.

24. Access network according to claim 21, wherein the advance of the offset ciphering sequence number used by the second controller with respect to that used by the first controller is effected by increasing said quantity contained in the adjustment data received from the first controller, and by allocating the M-P bits of the quantity thus increased to the M-P most significant bits of an initialization value of the offset number.

25. Access network according to claim 24, wherein the second controller is arranged to transmit a switchover control message to the radio terminal through the first controller in the transfer procedure after the reception of the adjustment data, and wherein said increased quantity is indicated in the switchover control message.

26. Access network according to claim 24, wherein the initialization value of the offset number corresponds to at least one initialization frame determinable by the radio terminal and by the second controller.

27. Access network according to claim 18, wherein the adjustment data comprise data representative of an offset between the ciphering sequence number used by the first controller and a time reference available to the second controller.

28. Access network according to claim 21, wherein, said offset being measured by the terminal on the basis of radio signals received from a base station linked to the second controller and carrying information relating to said time reference, the information relating to said time reference corresponds to a frame number represented on Q bits, Q being an integer such that $P < Q < M$.

29. Access network according to claim 18, comprising means for transmitting the adjustment data from the first controller to the second controller through the core network.

30. Access network according to claim 18, wherein the first and second radio access resources comprise different carrier frequencies.

31. Access network according to claim 18, wherein the first and second controllers are situated at a common network node, and comprise separate circuits in relation to the first and second paths, for at least some of the communication protocols including the information ciphering and deciphering functions, whereby said circuits communicate with one another asynchronously.

* * * * *